Oct. 25, 1932.  W. H. DAILY  1,885,006
AUTOMATIC PHONOGRAPH
Original Filed July 16, 1927   8 Sheets-Sheet 1
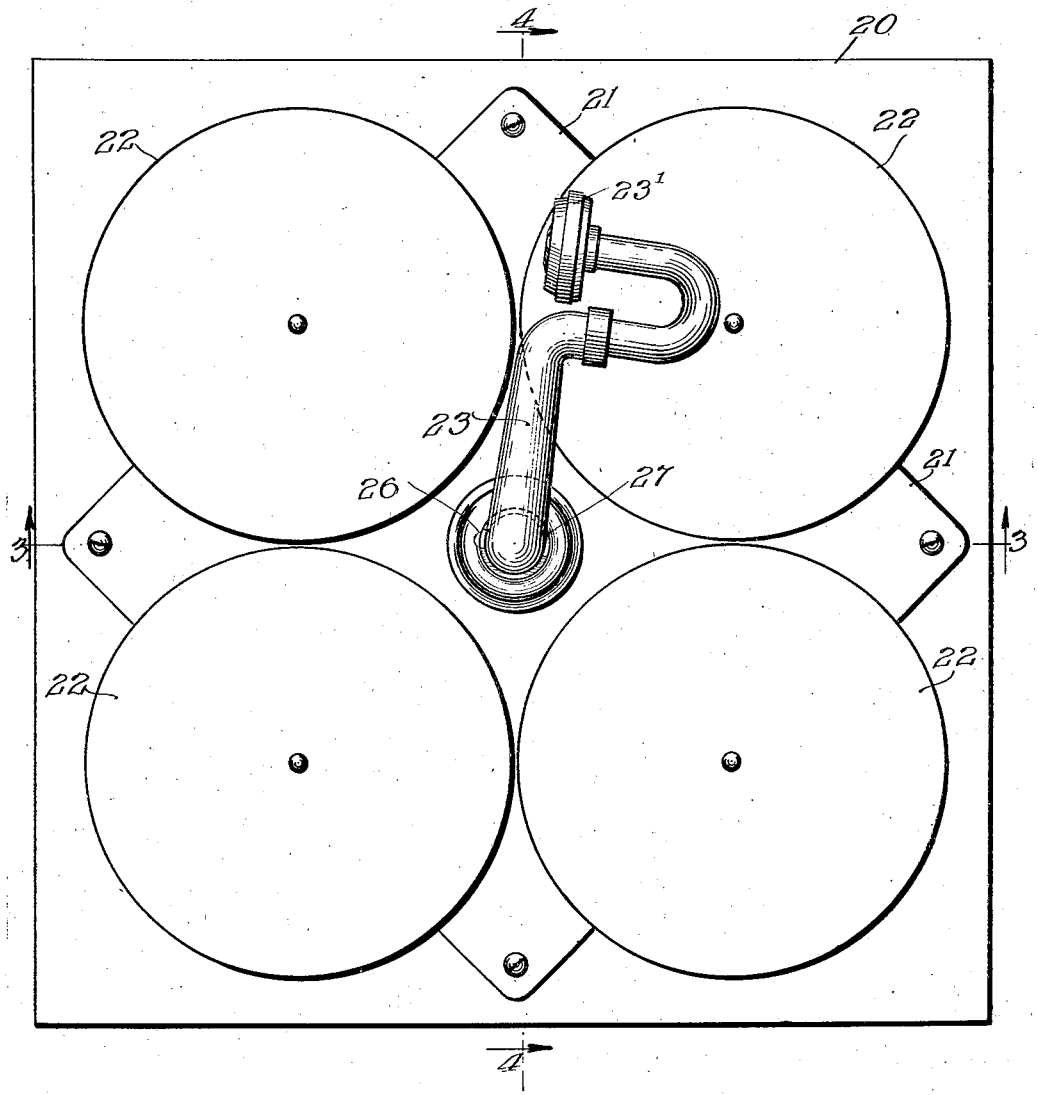

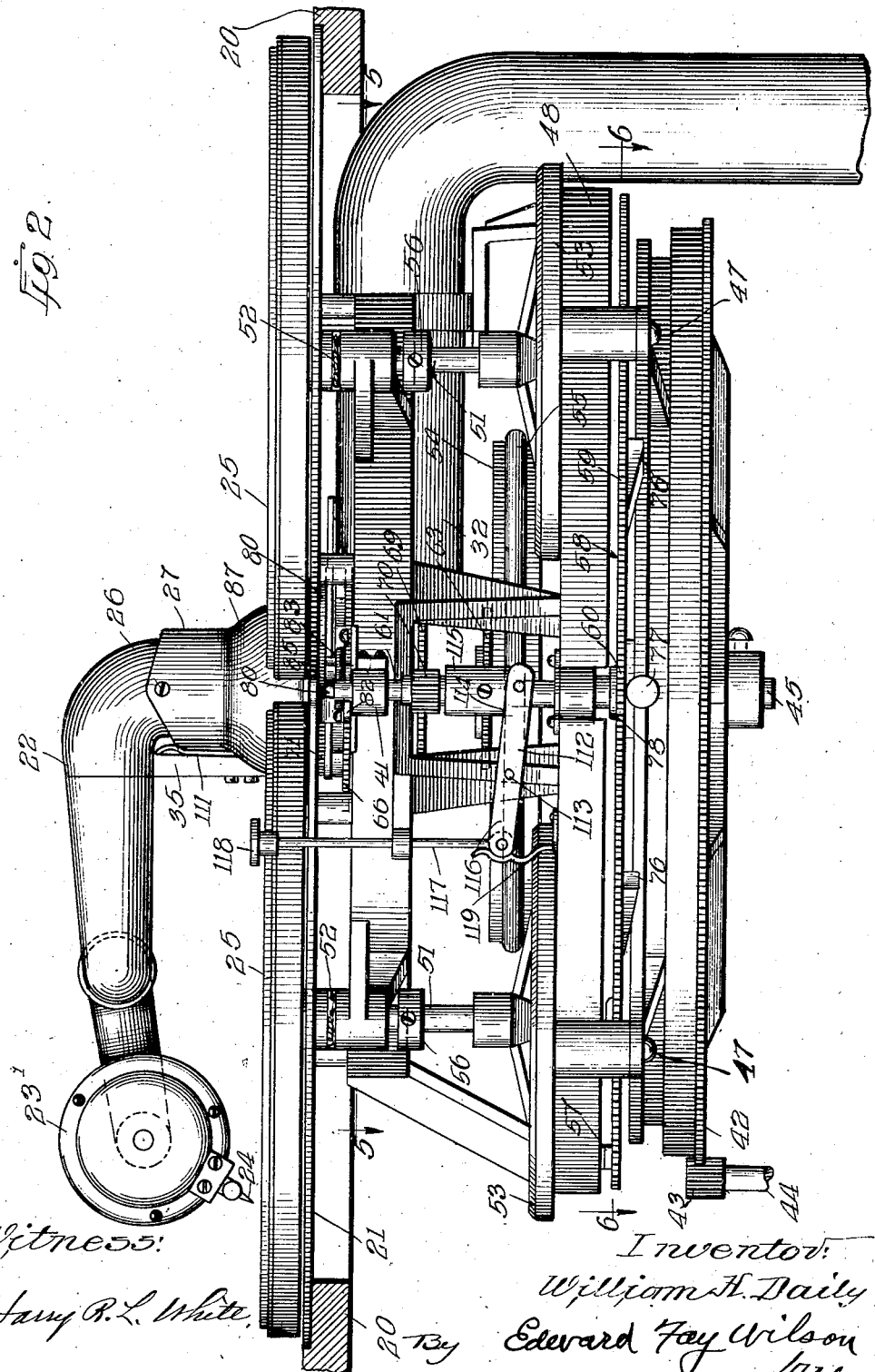

Oct. 25, 1932.  W. H. DAILY  1,885,006
AUTOMATIC PHONOGRAPH
Original Filed July 16, 1927   8 Sheets-Sheet 3

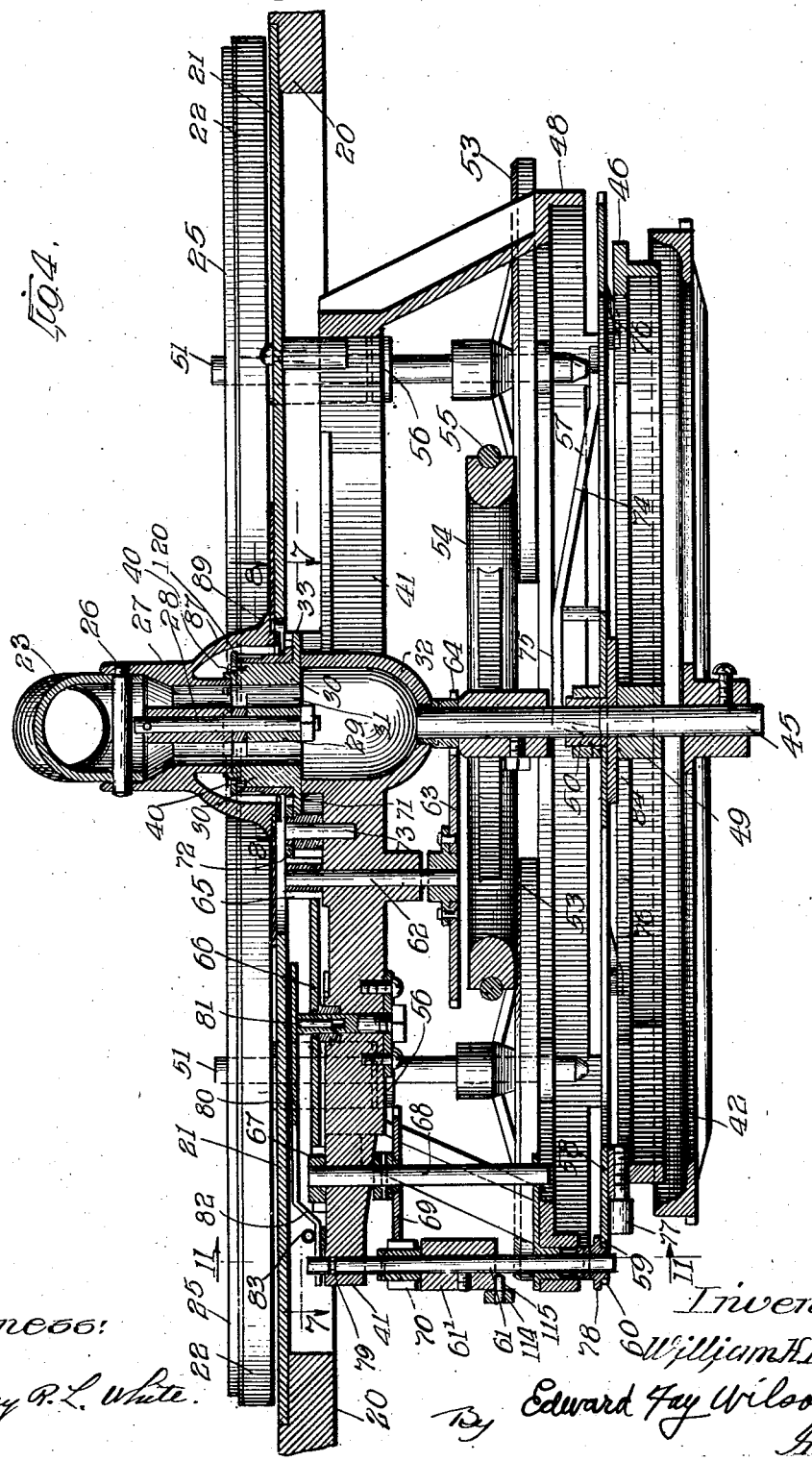

Oct. 25, 1932.  W. H. DAILY  1,885,006
AUTOMATIC PHONOGRAPH
Original Filed July 16, 1927   8 Sheets-Sheet 5

Oct. 25, 1932.  W. H. DAILY  1,885,006
AUTOMATIC PHONOGRAPH
Original Filed July 16, 1927    8 Sheets-Sheet 6
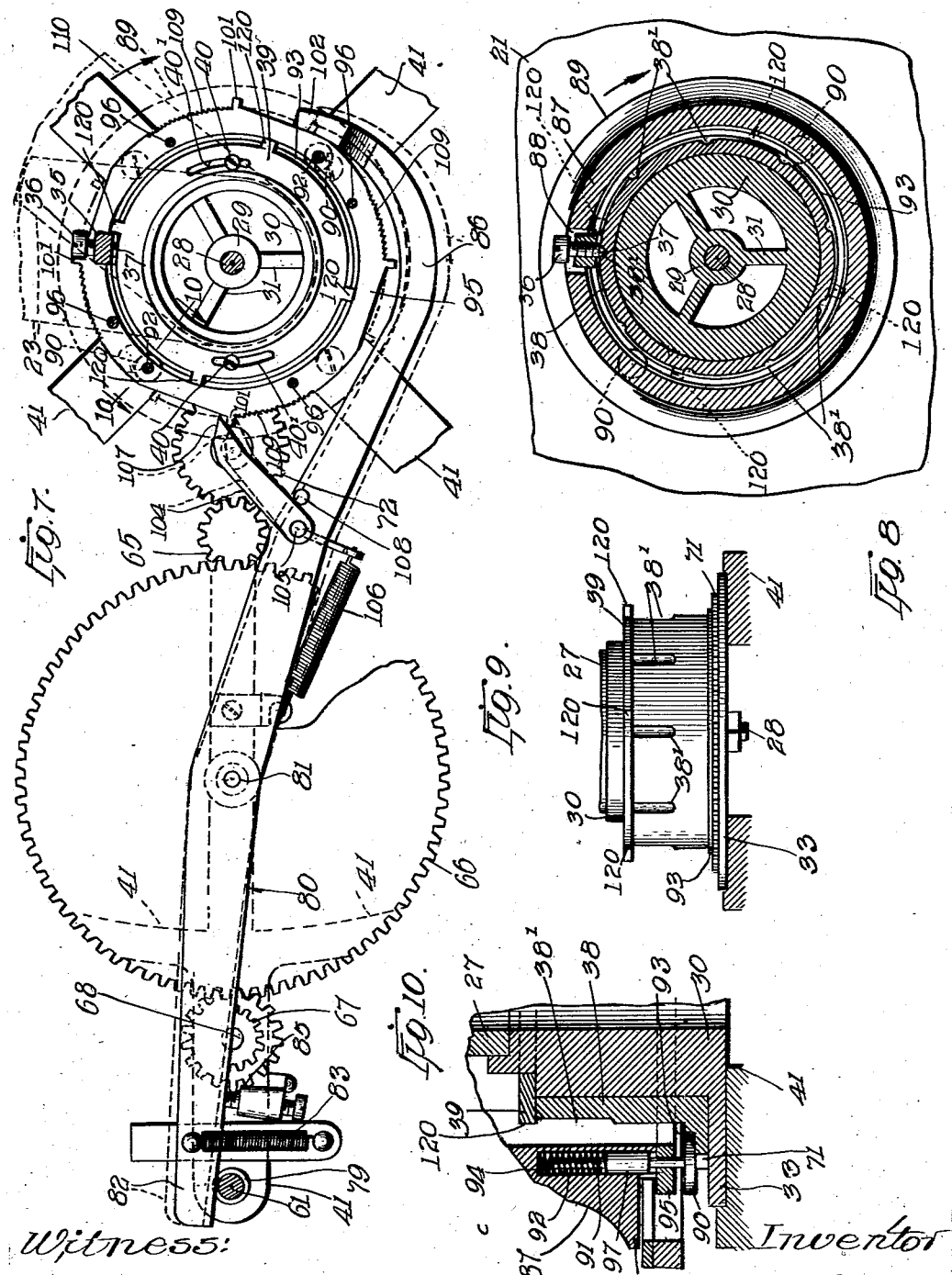
Witness:
Harry C. White
Inventor
William H. Daily
Edward Fay Wilson
By    Atty Oct. 25, 1932.   W. H. DAILY   1,885,006
AUTOMATIC PHONOGRAPH
Original Filed July 16, 1927 - 8 Sheets-Sheet 7
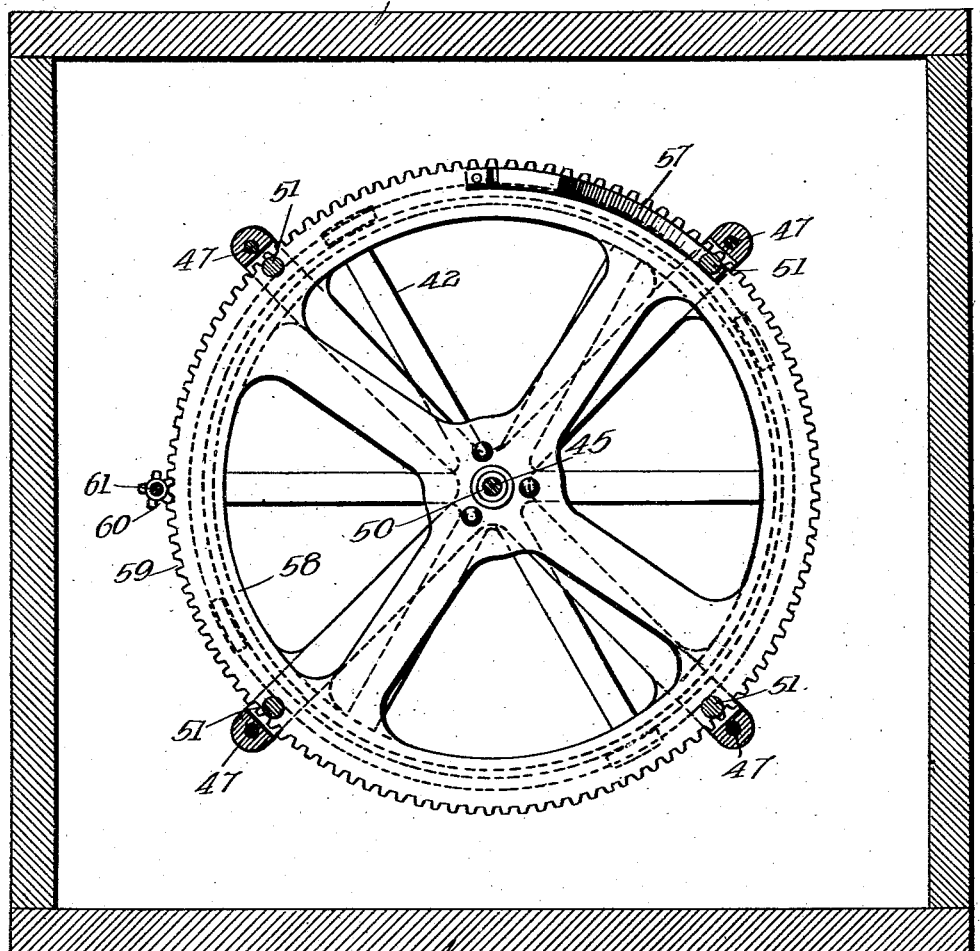
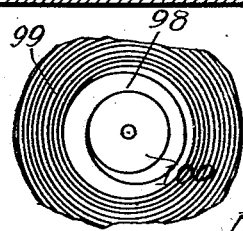
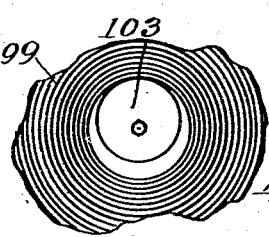

Oct. 25, 1932. W. H. DAILY 1,885,006
AUTOMATIC PHONOGRAPH
Original Filed July 16, 1927 8 Sheets-Sheet 8

Witness:
Harry W. L. White

Inventor:
William H. Daily
By Edward Fay Wilson
Atty.

Patented Oct. 25, 1932

1,885,006

UNITED STATES PATENT OFFICE

WILLIAM H. DAILY, OF CHICAGO, ILLINOIS

AUTOMATIC PHONOGRAPH

Application filed July 16, 1927, Serial No. 206,211. Renewed August 25, 1931.

My invention relates to sound reproducing machines and has particular relation to what are known as multiple disk phonographs.

My object is to provide a phonograph which can be arranged to play a number of disk records successively and which shall continuously repeat the playing of the records until stopped or changed. This present invention is an improvement on my earlier invention described and claimed in my copending application, Serial No. 128,987, filed August 13, 1926.

A particular object of this present invention is to simplify the automatic mechanism for controlling the advancing of the tone arm from one record to the next in series; to simplify the disk driving mechanism; to provide simplified, automatically operable means for controlling the successive playing of disk records regardless of whether the records have concentric or eccentric continuations of the stylus grooves; to provide simple means for positively swinging the tone arm forward from one disk to another.

In the present embodiment of my invention I have shown four disk turn-tables and a tone arm arranged to be swung around to properly cooperate with disks carried by the turn-tables, but it should be understood that my invention is not limited to an arrangement of four turn-tables. It will further be evident that my present invention is not limited to the use of a tone arm, except as this term may be said to broadly define the swinging arm which carries the stylus for following the reproducing groove.

My invention will be more readily understood by reference to the accompanying drawings forming part of this specification and in which:—

Fig. 1 is a plan view showing the several disk turn-tables and the tone arm;

Fig. 2 is a side elevation of the operating mechanism as seen from the left hand side, Fig. 1;

Fig. 3 is a vertical, central section on the line 3—3 of Fig. 1;

Fig. 4 is a vertical, central section taken on the line 4—4 of Fig. 1;

Fig. 6 is a horizontal section on the line 6—6 of Fig. 2;

Fig. 7 is an enlarged fragmentary plan view of the automatic throw-off mechanism and is a section on the line 7—7 of Fig. 4;

Fig. 8 is a horizontal detail section on the line 8—8 of Fig. 4;

Fig. 9 is a fragmentary side elevation showing the hub which causes the tone arm to swing from disk to disk;

Fig. 10 is a fragmentary, vertical section on the line 10—10 of Fig. 7;

Fig. 13 is a fragmentary plan view of a phonograph disk having a concentric extension of the reproducing groove; and Fig. 14 is a similar view of a disk having an eccentric continuation of the reproducing groove.

Figure 5:
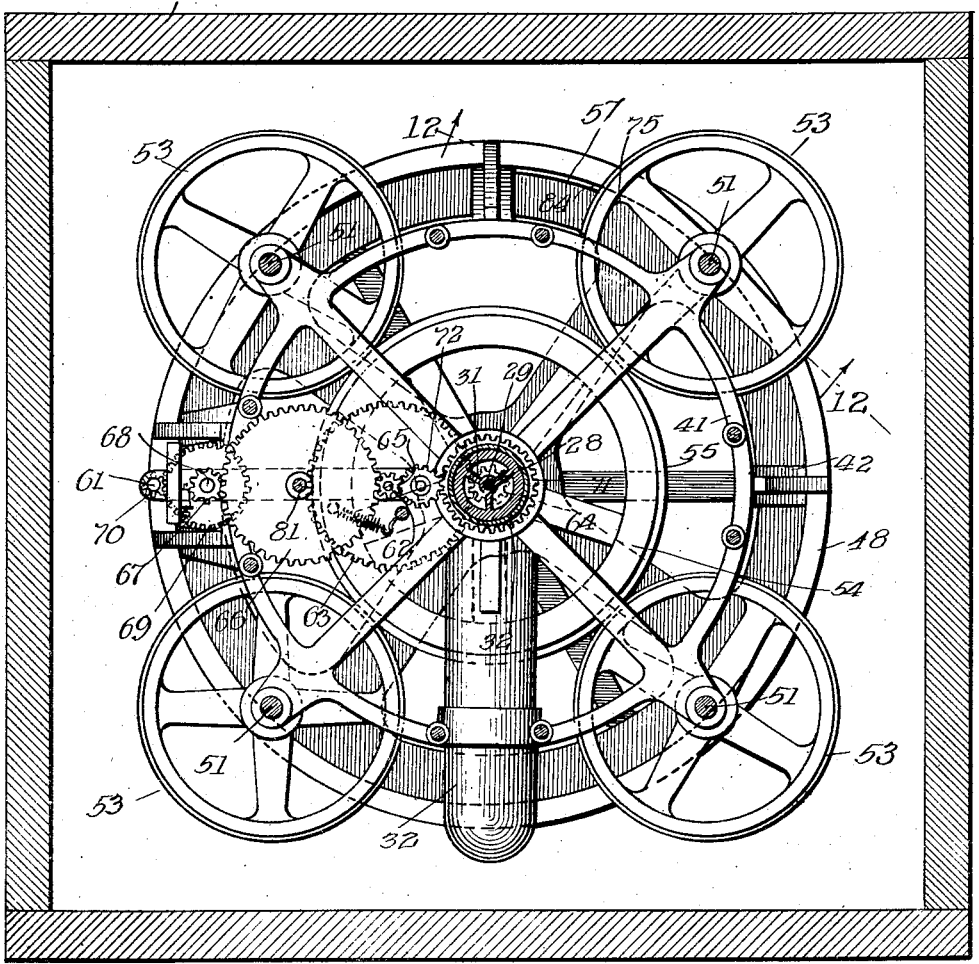
Fig. 5 is a horizontal section on the line 5—5 of Fig. 2.

In said drawings 20 indicates a casing or cabinet in which the mechanism is housed. A top plate 21 is provided supported on a part of the housing 20 and which top plate carries the mechanism. There are four horizontal turn-tables 22 for carrying disk records. These turn-tables are arranged in a circle at the center of which a tone arm 23 is mounted on a vertical axis so that it can swing around horizontally to cooperate with reproducing disks carried by the several turn-tables.

The automatic operation consists in raising and lowering the turn-tables successively, causing them to rotate when raised, and to remain stationary when lowered, causing the tone arm to swing forward to the next successive record after one has been played and causing the stylus carried by the tone arm to properly enter the reproducing groove of the record to be played.

An essential element of the operation of such a mechanism is the bringing together of the record and the stylus for the initiating of the playing of the record and the separation of the stylus and record when playing is completed, so that the tone arm can be swung forward to cooperate with the next successive record. To accomplish these results the turntables are arranged to normally lie in lower non-operative positions and to be raised to cooperate with the stylus. The tone arm is pivotally mounted to swing up and down to a slight degree and to swing around in a horizontal circle. The mechanism which is provided to accomplish the several coordinate movements is quite simple.

As shown in the drawings, the tone arm carries a sound producing device 23' at its outer or free end and this device carries a stylus or needle 24 for cooperation with the reproducing grooves of the disk records indicated at 25. The tone arm 23 is pivotally mounted at its base end on a horizontal pivot pin 26 carried by a central, hollow upstanding hub 27, which in turn is mounted for rotation on a central, vertical spindle 28. The spindle 28 is fixed in a central hub 29 rigidly mounted centrally in a short vertical section of tube 30 by radial connecting partitions 31. This short section of tube is secured on and connects with the top of a tubular member 32 which leads out horizontally and down to the usual horn not shown. The short section of tube 30 is provided on its lower end with a flange 33 and it is secured on the upper end of the tubular member 32 by screws 34. The spindle is secured rigidly in the hub 29 and the tubular section 27 is freely rotatable on the upper end portion of the spindle. The horn with the tubular section 27 swings freely around upon the spindle for permitting the stylus to follow the reproducing grooves in the records and for swinging the stylus from one record to the next. The records 25 are supported and carried by the turn-tables 22. The turn-tables normally lie at a lower inoperative position, and in order to bring the carried disk into cooperative relation to the stylus the turn-table is raised to a position where the stylus rests upon the disk and the tone arm is swung upward slightly on the pivot 26.

I make use of this up and down movement of the tone arm for effecting its movement from one disk to the next. For this purpose the tone arm has a depending rigid projection or arm 35 which extends down alongside of the short tubular member 30 and is provided at its lower end with a horizontally adjustable screw 36, the inner end 37 of which is adapted to contact with the outer cylindrical surface of a collar or sleeve 38 which is rotatably mounted on the short tubular section 30. This sleeve is mounted between the flange 33 upon which it rests and a top flange or plate 39 which is secured to the upper end of the short tubular section 30 by two screws 40. The flange 39 is provided with two concentric slots 40' for receiving the screws 40 and which permit the circumferential adjustment of the flange 39 for a purpose to be described.

The collar 38 is constantly driven at a slow speed during operation of the mechanism by means to be described, and in a direction to carry the tone arm forward from one disk to the next. When the tone arm is not held up by a disk it drops down until the point 37 of the screw 36 rests against the collar 38. Usually the friction thus produced is sufficient to carry the tone arm forward to the next disk. But to eliminate any possibility of the tone arm not swinging forward I provide shallow, vertical grooves 38' in the outer cylindrical surface of the sleeve 38 in which the part 37 of the screw 36 can engage if the tone arm lags behind the sleeve 38. When this occurs the tone arm is carried forward with the sleeve until lifted by the next disk. Secured to the underside of the top plate 21 is a rigid skeleton framework 41 in which the operating mechanism is mounted. This operating mechanism includes a large drive-wheel 42 having gear teeth on its periphery and adapted to be engaged by a pinion 43 on a vertical driving shaft 44 which may be driven by an electric motor or any other suitable means. The wheel 42 is mounted on the lower end of a vertically depending central shaft 45. The tubular part 32 forms part of the frame 41 and the upper end of the shaft 45 finds a bearing for its upper end in the elbow of said tubular part. The frame 41 includes a spider-like part 46 extending horizontally and secured at several points by screws 47 to a ring-like member 48 of the frame 41. The member 46 has a central bearing 49 and a collar 50 is secured to the shaft 45 and is adapted to contact with the upper end of the bearing 49 to support the shaft 45 and the gears carried by the same.

Each turn-table 22 is secured upon the upper end of a vertical shaft 51 which is mounted in suitable bearings on the frame 41 and is rotatable as well as movable up and down. The turn-table is supported at the lower limit of its movement by the frame 41, a soft washer 52 being interposed between the hub of the turn-table and the frame to eliminate noise. To drive the turn-table there is provided a drive-wheel 53 fixed on the shaft 51 and which is adapted to contact, at its periphery, with a yielding driving wheel 54 secured to the central shaft 45. The periphery of the driving wheel 54 is made yielding by means of an encircling relatively soft rubber member 55. As the turn-table is lifted from its lower inoperative position to its operative position the periphery of the wheel 53 is brought into frictional engagement with the rubber driving element 55 on the wheel 54. A collar 56 is fixed on the shaft 51 adapted to limit the lifting of the shaft 51.

For the purpose of lifting the turn-table shafts a lifting cam 57 is provided carried by a rotatable member 58. The rotatable member 58 is mounted to rotate on the central shaft 45 and is received on the fixed collar 50. Its outer periphery is provided with gear teeth 59 adapted to be engaged at times by a small pinion 60, Fig. 4, which is secured upon the lower end of a vertical shaft 61. This shaft is rotatably mounted in suitable bearings on the frame 41 and is movable up and down as well as rotatable. This shaft 61 is driven at a relatively slow speed, by a train of gears, from the central shaft 45. This train of gears, as best shown in Figs. 4 and 5, consists of a vertical shaft 62 mounted on the frame 41 and carrying on its lower end a gear wheel 63 meshing with a pinion 64 fixed to the central shaft 45, and on its upper end a pinion 65 meshing with an intermediate gear 66 which drives a pinion 67 carried on the upper end of a vertical shaft 68, which also carries a gear wheel 69 meshing with a pinion 70 fixed to the shaft 61 between its ends. The shaft 61 is constantly rotated while the mechanism is in operation and when the pinion 60 is in mesh with the teeth of the member 58 drives the same at a relatively slow speed. The member 58 is made of sheet metal so that portions of its periphery can be forced up from time to time for a purpose to be described.

Figure 12:
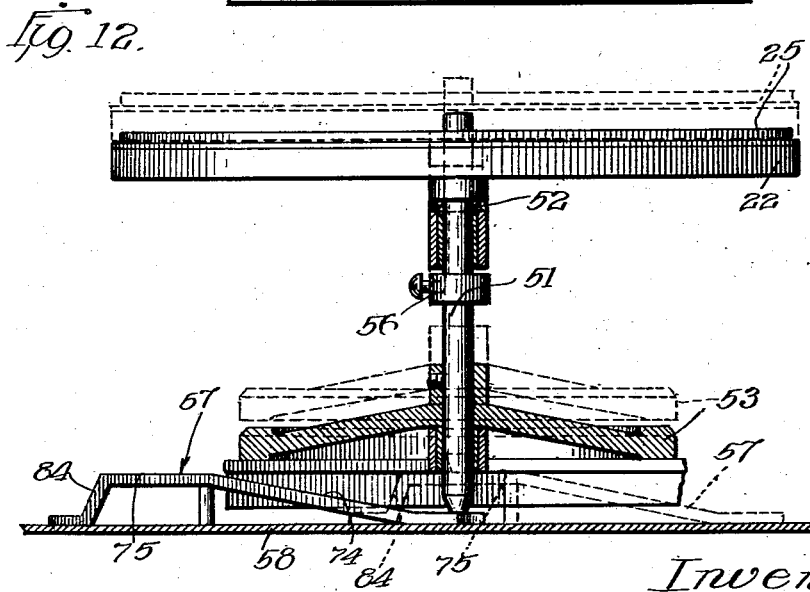
Fig. 12 is a fragmentary, vertical section on the line 12—12 of Fig. 5.

The central sleeve 38 has a circumferential toothed flange 71 at its lower end which meshes with an intermediate pinion 72 on a vertical shaft 73, which in turn meshes with and is driven by the pinion 65 on the upper end of the vertical shaft 62 and the sleeve is thereby constantly driven in a forward direction, and at a relatively slow speed while the mechanism is in operation. As best shown in Fig. 12, the lifting cam 57 has a relatively long inclined lifting part 74 and a horizontally extending holding part 75. In Fig. 12 the vertical movement of the turntable is indicated.

Figure 11:
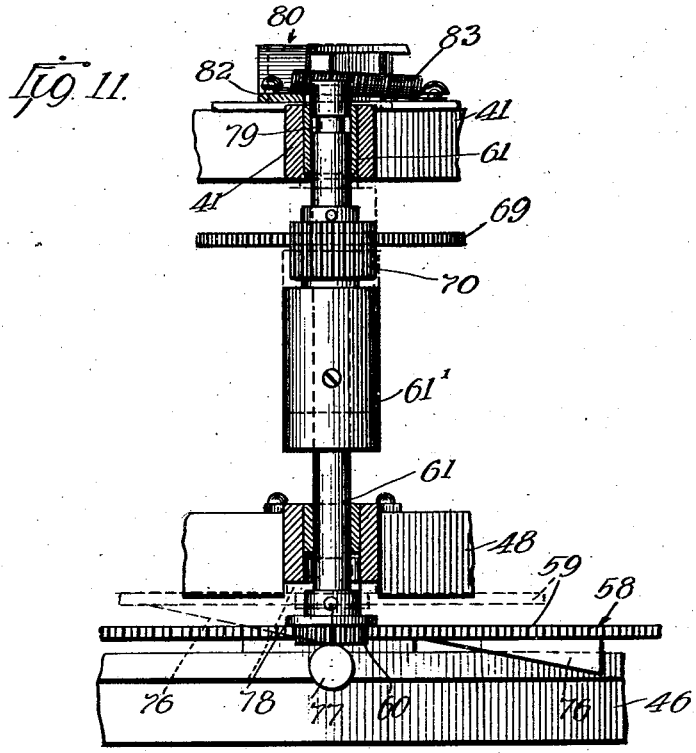
Fig. 11 is an enlarged fragmentary, vertical section on the line 11—11 of Fig. 4.

To cause the member 58 to rotate to lower one turn-table and lift the next in succession there are provided four wedge shaped cam parts 76 fixed on the under side of the member 58 and adapted to ride over a rigid projection 77 projecting out from the frame 41 below the vertical shaft 61. The pinion 60 has a flange 78 adapted to be engaged by the member 58 when it is lifted by one of the wedge cams 76 as it runs over the projection 77. As the pinion 60 is rigid with the vertical shaft 61, when the pinion 60 is lifted, the shaft 61 is also lifted. The upper end of the shaft 61 projects above the top of the frame, as shown in Figs. 4 and 11, and is provided with a square circumferential groove 79 near its upper end and arranged to be projected above the upper surface of the frame 41, as shown in dotted lines, when the shaft 61 is lifted by the member 58 and one of the wedge cams 76. The shaft having been lifted is retained in its upper position by a horizontally swinging lever 80 which lies flat on the upper surface of the frame 41 and is pivotally mounted on the frame between its ends at 81. This lever controls the starting of the rotation of the member 58, which in turn controls the lifting and dropping of the turn-tables to cause the successive playing of the records. The shaft 61 drops down when freed from the latch lever 80, and to ensure the dropping down of the shaft it is made relatively heavy by a weight 61' secured to the shaft.

The wedge cams are relatively short and when one of these cams passes over the projection 77 and lifts the edge of the member 58 and through the flange on the pinion 60, the shaft 61, the outer end 82 of the lever 80 is drawn into the groove 79 in the shaft 61 by a pull string 83 and holds the shaft 61 in its lifted position. As soon as the lifting wedge cam 76 has passed the projection 77 the member 58 drops down, the pinion 60 is disengaged and the member 58 stops rotating. The arrangement between the stopping of the member 58 and the turn-table lifting cam 57 is such that when the member 58 is stopped the shaft of the turn-table which has been lifted by the lifting cam 57 is located near the dropping end 84 of the flat upper part 75 of the lifting cam 57, see dotted position, Fig. 12, ready to be dropped upon a slight rotation of the member 58 when it is again started. An adjustable stop 85 is provided which is contacted by the edge of the lever 80 when drawn into the groove 79 by the spring 83.

The opposite or iner end 86 of the lever 80 projects in to the center of the mechanism and partly encircles the base of the tubular hub 27 upon which the tone arm 23 is mounted. This hub 27 has an enlarged skirt portion 87 which depends and covers the grooved collar 38 and is provided with a vertical slot 88 through which the depending rigid projection or arm 35 projects, so that the screw 36 can contact with the collar 38. This skirt portion 87 has an enlarged base 89, the lower surface of which is spaced slightly above and free of the base flange 71 of the sleeve 38, see Figs. 3 and 4. This skirt portion 87 is large enough in diameter to be free of the parts covered by same and to ensure the free rotation of the tone arm with its base. I provide two friction members 90, see Figs. 8 and 10, carried by the enlarged base 89 of the skirt portion 87. Each of these friction members 90 consists of a flat disk-like roller 93 fixed on the lower end of a vertical shaft 91 which projects up into a vertical opening 92 provided in the skirt portion 87. To hold these rollers in position and avoid any possibility of their carrying any weight vertically, which would cause undue friction, the rollers 93 with their shafts 91 are yieldingly mounted vertically. This is accomplished by a relatively weak compressing spring 94 in the inner end of the opening 92 and which tends to push the shaft 91 downwardly. The shafts 91 are retained against removal by a flange member 95 which is secured flat against the lower surface of the skirt member 87 by pins 96 and by tubular shoulder members 97 fixed uponu the shafts 91. The upper ends of the tubes 97 form shoulders for the springs 94 and the lower ends contact with the flange 95. These members 93 contact at their lower surfaces with the circumferential flange 95 upon the outer edge of which the gear 71 is formed. This flange is constantly rotating in a forward direction and the members 93 are held in light frictional contact therewith, sufficient to cause the tone arm to be swung forward also.

The outer periphery of the flange 95, as best shown in Fig. 7, is formed to control the movement of the lever 80 to release the shaft 61 and start the member 58 into motion. This action should occur promptly upon the completion of the playing of a disk and, as has been mentioned, it is initiated by the movement of the stylus either into an eccentric continuation of the reproducing groove or into a concentric extension of same. To swing the lever 80 against the holding action of the spring 83 by the movement of the stylus through a spiral groove 98 which connects the reproducing groove 99, see Fig. 13, with the concentric extension 100 of same, this spiral portion 98 of the groove carries the tone arm forward and is arranged to swing same beyond a certain definite point. The flange 95 is provided with four equally circumferentially spaced outwardly extending projections 101, see Fig. 7; and these projections are so arranged in relation to the extremity 102 of the inner end 86 of the lever 80 that just as the tone arm is swung forward by reason of the stylus following through the spiral portion 98 of the groove, one of the projections 101 engages the inner extremity 102 of the lever 80 and causes the lever to swing clockwise against the spring 83 and release the shaft 61. As shown in dotted lines, Fig. 7, upon the further rotation of the tone arm the operating projection 101 passes by the lever 80 and the lever is ready to have its outer end engaged in the groove in the shaft 61 when the same is again lifted. Ordinarily the stops 101, for stopping the forward swinging of the tone arm, are so set that the stylus contacts with the disk being lifted on the plane marginal edge of the disk just outside of the reproducing groove. As explained above, as the record disk reaches its operating position the tone arm is lifted far enough to swing the stop arm 35 out to pass the adjacent stop projection 120 and in this movement of the arm the projection 37, is swung out away from the member 38 and at this time the frictional contact of the friction members 90 comes into play to cause the tone arm to swing forward and cause the stylus to enter into the reproducing groove. While the rotational effect of the friction members is operative at all times, it is so slight that it does not disturb the normal advancement of the stylus through the groove of the disk.

In Fig. 14 I have illustrated an eccentric groove 103 which forms an extension of the usual reproducing groove 99, and I provide means whereby when the stylus runs into this eccentric groove 103 the lever 80 will be swung to release the shaft 61. This means consists of a dog and ratchet arrangement by which the backward swinging of the tone arm will effect the swinging of the lever 80. I provide a dog member 104 pivotally mounted between its ends at 105 on the inner end portion of the lever 80 to swing in the plane of said lever. A pull spring 106 attached to the inner end of the dog 104 and to the frame 41 tends to hold the inner end 107 of the dog against the periphery of the flange member 95. A stop 108 on the lever 80 limits the inner swinging of the dog 104. The inner extremity of the dog 104 is provided with a vertical V-edge adapted to engage in ratchet teeth 109 provided on the periphery of the flange 95. There are four of the groups of the ratchet teeth 109 provided and they are arranged to cooperate with the dog 104 when the stylus enters an eccentric groove in a disk carried on any one of the four turn-tables. The normal direction of movement of the flange 95 is in the direction of the arrow 110 on Fig. 7, and when the stylus enters an eccentric groove in a record the flange 95, due to the consequent oscillating movement of the arm, is swung backward, and as the free end of the dog 104 is at this time engaged with one of the teeth 109, the inner end of the lever 80 is swung in the same direction as it would be by the engagement of its free end with one of the projections 101, thus releasing the shaft 61 to drop and start the mechanism into operation.

For the purpose of relieving the stylus of a portion of the weight of the tone arm, I provide a flat spring 111 secured to the inner side of the depending projection 35 and adapted to be pressed at its upper end against the outer surface of the tubular member 27, as best shown in Fig. 3.

At times it is desirable to prevent the automatic operation of the mechanism and retain the tone arm in position to cooperate with but one of the turn-tables. For this purpose I provide simple means for retaining the shaft 61 at the upper limit of its movement and with the pinion 60 out of mesh with the gear member 58. This means consists of a lever 112, see Fig. 2, pivotally mounted between its ends on the frame 41 at 113. One end 114 of this lever engages beneath a collar 115 carried by the shaft 61 and the other end 116 is pivotally connected to the lower end of an operating rod 117 which extends up through the top plate 21 and is provided at its upper end with a lifting knob 118. The arrangement is such that when the rod 117 is pushed down the shaft is lifted. Once the rod has been pushed down to lift the shaft 61 it is retained in such position by any suitable means, such as friction or by means of a yielding holding member shown at 119.

To stop the tone arm, as it is being swung forward by the contact of the depending arm 35 with the rotating sleeve 38, the adjustable flange 39 is provided with radial projections 120, one for each turn-table and in position to contact with the arm 35. As the playing of one disk is completed the turn-table carrying the disk just played is lowered, the tone arm drops down until the arm 35 contacts with the sleeve 38 and it is then swung forward to be positioned ready for the next disk when it is raised. To accurately position the tone arm so that the stylus will properly enter the reproducing groove of the next record, the arm 35 contacts with the next projection 120 on the flange 39. This occurs in advance of the complete lifting of the disk. When the disk is completely lifted the tone arm is raised slightly by the contact of the stylus with the disk, and in being thus lifted the arm 35 is swung out to pass the projection 120. The flange 39 is made adjustable to a slight extent circumferentially so that the starting position of the stylus on the disks may be accurately set. It has been found best to have the stylus first contact with the disk just outside of the beginning of the reproducing groove, and the length of the tone arm is such that the drag of the rotating disk on the stylus assists in swinging the tone arm forward until the stylus enters the reproducing groove.

As many modifications of my invention will readily suggest themselves to one skilled in the art, I do not limit or confine my invention to the specific details of construction herein shown and described, except within the scope of the appended claims.

I claim:

1. In a multi-disk phonograph, a plurality of turn-table disk supports arranged in a circle, the turn-tables being movable up and down from inoperative to operative positions, a stylus carrying arm rotatably mounted at the center of said circle, a cylindrical rotatable member mounted concentrically with the mounting of said arm for swinging the arm forward from turn-table to turn-table, means for moving the turn-tables up successively for operative contact with the stylus, the arm being pivotally mounted to swing up and down a slight amount and to be lifted by a disk as its turn-table is lifted, a projection on the arm adapted to frictionally engage upon the cylindrical surface of said concentric member to swing the arm forward when it is unsupported by a disk, said cylindrical surface having shoulders adapted to be engaged by said projection to assist in the swinging of said arm.

2. In an automatic phonograph, an arm mounted at its base end for swinging around in a horizontal plane, pivotal means at the inner end of the arm permitting the outer end of the arm to swing up and down, a stylus carried by the free end of the arm, for contact with a sound record carried by the phonograph, and arranged to support the free end of the arm slightly above its lower limiting position when in operative contact with a record, a rotatable member at the base of the arm, a projection on the arm adapted to be pressed into frictional engagement with said rotatable member for frictional engagement therewith when the arm is not held up at its free end by a record, the rotatable member having depressions adapted to receive the contacting part of said projection to enhance the rotational action on the arm.

3. In a automatic phonograph for playing disk records, automatic means for operating the phonograph, a horizontally swinging arm, a stylus carried by the arm, a rotatable member at the base of the arm, means for rotatably engaging the arm with said member, a base flange on said rotatable member, a latch lever for controlling the automatic operation of the phonograph, a projection on said base flange for contact with said latch lever for initiating the automatic action when disk records having a spiral extension of the reproducing groove are played, a dog carried by said lever and a series of ratchet teeth on said flange for engagement by said dog for initiating the automatic action when disk records having an eccentric extension of the reproducing groove are played.

4. In an automatic phonograph of the kind described, a plurality of turn-tables, means for successively rotating the several turn-tables, including a constantly rotating shaft, means for moving the shaft up and down, a rotatable member controlling the operation of the several turntables, means for operatively engaging the constantly rotating shaft with the rotatable member when the shaft is at the lower limit of its movement, means for disengaging the shaft from the member when the shaft is at the upper limit of its movement, latch means for holding the shaft raised until a record has been played, and manually operable means for retaining the shaft in raised position independently of the latch means.

5. In a multiple disk phonograph, an arm mounted for swinging from disk to disk, a stylus carried by the arm, means for separating the stylus and a disk at the conclusion of the playing of the disk, means for swinging the arm from disk to disk operable when the stylus is separated from a disk, means for disconnecting said swinging means when the stylus is again brought into contact with a disk, and an auxiliary arm swinging means adapted to produce a slight swinging force on the arm for causing the stylus to enter the groove on a disk after the main swinging means is disconnected.

6. In a phonograph of the kind described, a plurality of turn-tables arranged in a circle and adapted to be raised from an inoperative to an operative position, an arm mounted to swing around in a circle from one to another of the turn-tables, a stylus carried by the arm for cooperation with the grooves of disks carried by the turn-tables for sound reproduction, the arm mounted to swing up and down slightly and to be supported in its upper position by the contact of the stylus with a disk, a constantly rotating member at the base of the arm, a projection carried by the arm adapted to contact with the rotating member when the arm is unsupported by a disk and cause the arm to swing from disk to disk, and auxiliary friction means rotatably connecting the arm and said member when the arm is supported by a disk to produce a slight rotative effect on the arm at such time.

7. In a phonograph, a turnable adapted to support a phonograph disk, a stylus carrying arm rotatably mounted to swing around a fixed point, a stylus carried by the free end of the arm, the arm mounted to position the stylus above the turntable for co-operation with a record disk carried thereby, means for raising the turntable from a lower inoperative position to an upper operative position, the arm being pivotally mounted for slight movement up and down and adapted to be lifted slightly by a disk on the turntable when the turntable is lifted, a cylindrical rotatable member mounted concentrically with the mounting of the arm for swinging the arm around its center of movement, a projection on the base of the arm adapted to frictionally engage upon the cylindrical surface of said concentric member to swing the arm when unsupported by a disk, said cylindrical surface having shoulders adapted to be engaged by said projection for enhancing the rotational action of the cylindrical member on the arm.

8. In an automatic phonograph, a horizontally rotatable arm, the arm being pivotally mounted at its base end for slight up and down movement, a stylus carried by the arm at its free end for contact with a sound record and adapted at such time to support the arm slightly above its lowermost position, a rotatable member at the base of the arm, a projection on the arm adapted to be pressed by the arm into frictional engagement with the rotatable member when the arm is not supported by the stylus, and means for enhancing the frictional engagement of the arm with the rotatable member.

9. In an automatic phonograph, a horizontally rotatable arm, the arm being pivotally mounted for slight up and down movement, a stylus carried by the arm, a rotatable member at the base of the arm, the arm adapted to frictionally engage the rotatable member to be rotated thereby, and yielding means for enhancing said frictional engagement.

In testimony whereof, I have hereunto set my hand, this 7th day of July, 1927.

WILLIAM H. DAILY.